US006400866B2

(12) United States Patent
Ranka et al.

(10) Patent No.: US 6,400,866 B2
(45) Date of Patent: Jun. 4, 2002

(54) DECOUPLING OF TRANSVERSE SPATIAL MODES IN MICROSTRUCTURE OPTICAL FIBERS

(75) Inventors: Jinendra Kumar Ranka, Brookline, MA (US); Robert Scott Windeler, Annandale, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/773,702

(22) Filed: Feb. 1, 2001

Related U.S. Application Data
(60) Provisional application No. 60/186,949, filed on Mar. 4, 2000.

(51) Int. Cl.[7] ................................................ G02B 6/16
(52) U.S. Cl. ........................................ 385/28; 385/127
(58) Field of Search ................................ 385/123–125, 385/142, 122, 127; 264/210.8, 211.15, 78, 237, 234, 211.17; 65/428; 359/154, 173

(56) References Cited

U.S. PATENT DOCUMENTS

| | | | | |
|---|---|---|---|---|
| 4,542,063 A | * | 9/1985 | Tanji et al. | 264/210.8 |
| 4,618,211 A | * | 10/1986 | Fleury | 385/123 |
| 4,732,720 A | * | 3/1988 | Tanji et al. | 264/101 |
| 5,802,236 A | * | 9/1998 | DiGiovanni et al. | 385/125 |
| 6,097,870 A | | 8/2000 | Ranka et al. | 385/127 |

OTHER PUBLICATIONS

Ranka et al., Visible Continuum . . . , Optics Lett., vol. 25, No. 1, pp. 25–27 (Jan. 00).
Windeler et al., Novel Properties . . . , OFC 2000, pp. ThG3–1 to 3–2 (Mar. 00).
Windeler, Novel Properties . . . , OSA 2000, Annual Meeting, pp. 74 (Oct. 00).
Windeler, Novel Properties . . . , CLEO 2000, pp149 (Sep. 00).
Ranka et al., Optical Properties . . . , Optics Lett., vol. 25, No. 11, pp. 796–798 (Jun. 00).

* cited by examiner

*Primary Examiner*—Akm E. Ullah
(74) *Attorney, Agent, or Firm*—Michael J. Urbano

(57) ABSTRACT

A properly designed MOF can simultaneously exhibit large anomalous dispersion at visible and near infrared wavelengths and support numerous transverse spatial modes that are essentially decoupled from one another, even in the presence of significant perturbations. In a MOF that includes an inner cladding region comprising at least one thin layer of air holes surrounding a core region, the key is to achieve a relatively large wave vector mismatch between the lowest order modes by appropriate design of the size of the core region and of the effective refractive index difference between the core region and the inner cladding region. In accordance with one aspect of our invention, MOFs are designed to exhibit simultaneously relatively large anomalous dispersion and essentially decoupled transverse spatial modes by making the diameter of the core region less than about 6 $\mu$m and the difference in effective refractive index between the core and cladding regions greater than about 0.1 (10%). Preferably, the cladding region contains no more than 2 layers of air holes, and the distance between the nearest edges of adjacent air holes is less than about 1 $\mu$m. MOFs with these features enable several embodiments of our invention.

15 Claims, 4 Drawing Sheets

DECOUPLING OF TRANSVERSE SPATIAL MODES IN MICROSTRUCTURE OPTICAL FIBERS

CROSS-REFERENCE TO RELATED APPLICATIONS

This application claims priority from provisional application Ser. No. 60/186,949 filed on Mar. 4, 2000 and was concurrently filed with application Ser. No. 09/773,691 (Ranka 4-20-14) entitled Microstructure Optical Fibers for Dispersion Management in Optical Communication Systems.

FIELD OF THE INVENTION

This invention relates generally to optical systems and apparatus that exploit the decoupling of transverse modes in microstructure optical fibers (MOFs).

BACKGROUND OF THE INVENTION

Microstructure optical fibers (MOFs) have recently been shown to exhibit large values of anomalous dispersion (positive D) for wavelengths above ~700 nm. See, U.S. Pat. No. 6,097,870 filed on May 17, 1999 and issued on Aug. 1, 2000 to J. K. Ranka and R. S. Windeler (hereinafter the Ranka-Windeler patent) and J. K. Ranka et al., Optics Lett., Vol. 25, No. 1, pp. 25–27 (January 2000), both of which are incorporated herein by reference. In the 600–1100 nm wavelength range MOFs allow for a myriad of nonlinear effects that have previously not been possible or have been severely limited due to the large normal dispersion (negative D) of standard silica fibers. These effects include broadband continuum generation, four-wave mixing, and pulse compression.

In nonlinear optical interactions such as sum-frequency generation and four-wave mixing, the efficiency of the process depends strongly on the wave-vector mismatch, also known as the phase mismatch, between the pump and signal waves. See, for example, Agrawal, Nonlinear Fiber Optics, Academic Press (1995), which is incorporated herein by reference. In optical fibers, phase matching can be achieved by using either birefringence, where the pump and generated signals are in different polarization states, or by using multimode fibers, where the pump and generated signals are in different transverse spatial modes. One limitation to multimode phase matching is that random fluctuations and perturbations of the fiber will mix the various generated modes, reducing the efficiency of the process and generating a spatially incoherent output.

Thus, a need remains in the art for an optical fiber in which the transverse spatial modes are essentially decoupled from one another even in the presence of significant perturbations.

Such a fiber would allow not only for efficient nonlinear optical interactions in processes of the type discussed above, but also for information to be impressed on individual spatial modes in an optical communication system.

SUMMARY OF THE INVENTION

We have found that a properly designed MOF can simultaneously exhibit large anomalous dispersion at visible and near infrared wavelengths and support numerous transverse spatial modes that are essentially decoupled from one another, even in the presence of significant perturbations. In a MOF that includes an inner cladding region comprising at least one thin layer of air holes surrounding a core region, the key is to achieve a relatively large wave vector mismatch between the lowest order modes by appropriate design of the size of the core region and of the effective refractive index difference between the core region and the inner cladding region.

The surprising result is that such a MOF can be made to appear to be single mode with propagation properties that heretofore could be achieved in multimode waveguides only.

In accordance with one aspect of our invention, MOFs are designed to exhibit simultaneously relatively large anomalous dispersion and essentially decoupled transverse spatial modes by making the diameter of the core region less than about 6 $\mu$m and the difference in effective refractive index between the core and cladding regions greater than about 0.1 (10%). Preferably, the cladding region contains no more than 2 layers of air holes, and the distance between the nearest edges of adjacent air holes is less than about 1 $\mu$m.

MOFs with these features enable several embodiments of our invention. One embodiment is a nonlinear optical system comprising an optical pump source, an optical signal source, a utilization device and an optical fiber transmission path that optically couples the sources to the device. The transmission path includes at least a section of MOF in which at least two transverse modes remain decoupled from one another over the length of the MOF section, the output of the pump source propagating in one of the transverse modes and the output of the signal source propagating in another of the transverse modes. Another embodiment is an optical transmission system comprising an optical transmitter, a utilization device and an optical fiber transmission path that optically couples the transmitter and the utilization device. The transmission path includes at least a section of MOF in which at least two transverse modes remain decoupled from one another over the length of the MOF section, and further includes a first modulator for impressing information on a first optical signal to be propagated along the MOF in one of the transverse modes and a second modulator for impressing information on a second optical signal to be propagated along the MOF in another of the transverse modes.

BRIEF DESCRIPTION OF THE DRAWING

Our invention, together with its various features and advantages, can be readily understood from the following more detailed description taken in conjunction with the accompanying drawing, in which:

FIG. 4(a) shows the far-field pattern of a second-harmonic output, whereas

In the interest of clarity and simplicity, FIGS. 1–2 and 5–6 have not been drawn to scale.

DETAILED DESCRIPTION OF THE INVENTION

This description will be divided into several sections: first, we describe the general design of microstructure optical fibers (MOFs); second we describe modifications of the general design that render MOFs suitable for simultaneously generating, at wavelengths at visible and near infrared wavelengths, (1) relatively large, anomalous dispersion (positive D) as well as (2) decoupled transverse spatial modes; third, we describe several examples and the results of associated experiments and/or simulations; and lastly, we discuss applications of such fibers.

Microstructure Fiber Design

Figure 1:
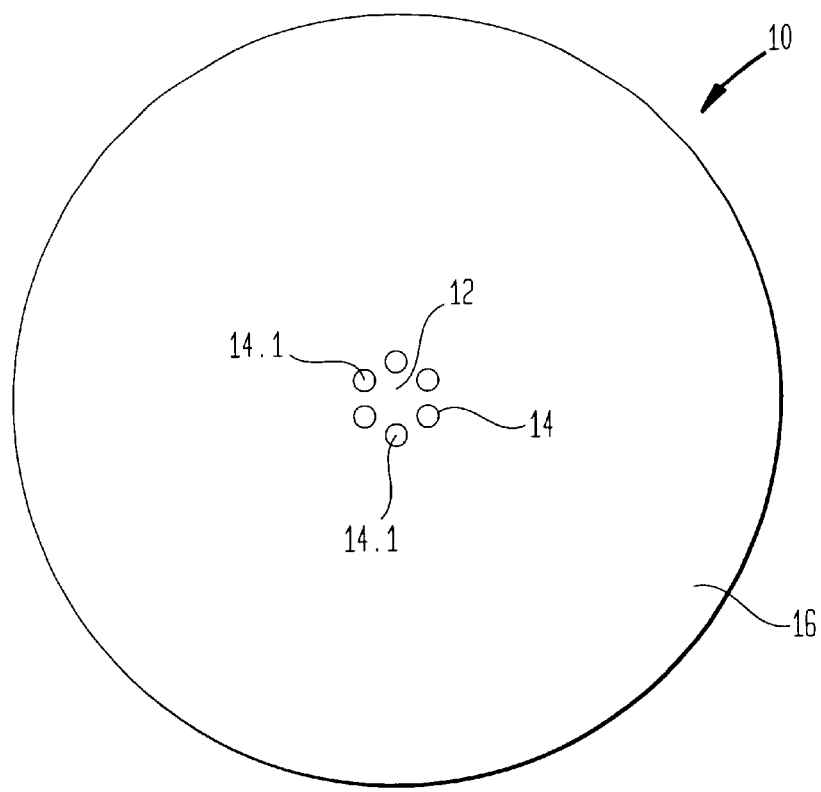
FIG. 1 is a schematic, cross-sectional view of a microstructure optical fiber in accordance with one embodiment of our invention in which a single layer of air holes forms a closely packed hexagon around a core region.

With reference now to FIG. 1, we show a schematic cross-section of a MOF 10 of the type described in the Ranka-Windeler patent, supra. The core region 12 is surrounded by an inner cladding region 14 and an outer cladding region 16. The core region may be doped or undoped; solid or liquid; birefringent or non-birefringent. It may take on a variety of shapes; e.g., essentially circular or elliptical. The effective refractive index of the inner cladding region 14 is lower than that of the core region in order to provide index-guiding of radiation propagating down the longitudinal axis of the fiber. On the other hand, the outer cladding region 16 provides strength to the fiber. The inner cladding region includes a multiplicity of relatively low index cladding features 14.1 that serve to lower the effective refractive index of the inner cladding region and to provide index-guiding of radiation propagating in the core region. (The outer cladding region need not include such features.) Illustratively, these features constitute capillary air holes that have circular cross sections and are formed in a higher index matrix of, for example, glass. Typically the core and outer cladding regions are also made of glass, and typically also the glass is silica. On the other hand, to increase nonlinear effects of the type discussed below, the core region may be made of other materials such as telluride glass.

Figure 2:
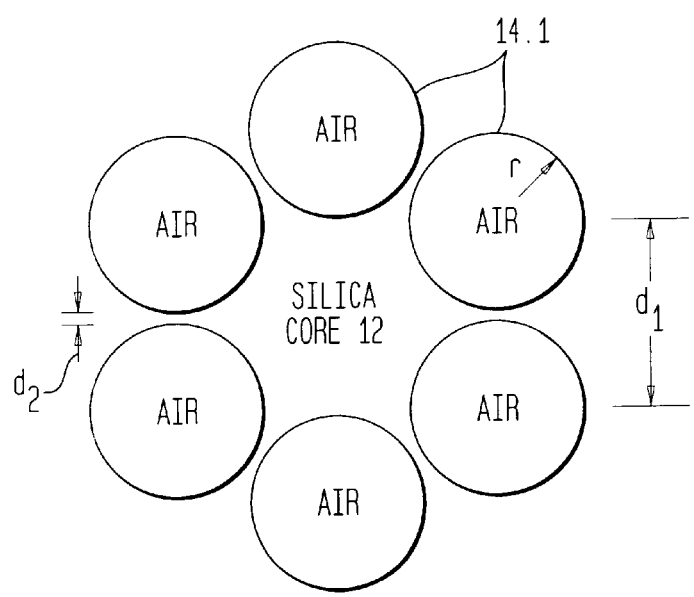
FIG. 2 is an expanded view of the core and air hole regions of the fiber of FIG. 1.

At least one relatively thin "layer" of inner cladding features is positioned circumferentially and wrapped around the core to form a closely packed polygon. The Ranka-Windeler patent defines thin to mean that the outermost, circumferential boundary of the features is less than about 10–30 $\mu$m from the outermost, circumferential boundary of the core region. Features beyond about 10–30 $\mu$m play no significant role in the index guiding of radiation modes at visible to near infra-red wavelengths. In the case of a single layer of features, the distance between the two boundaries is approximately equal to the size (e.g., diameter) of the features. FIG. 2 illustrates such a single layer design for the case where the features are air holes and the pattern formed by their cross-sections is a hexagon (other geometric shapes, such as triangles, are also suitable); the core region, as well as the interstitial spaces between the air holes, comprise silica. Illustratively, an as applied to the embodiments of this invention, the air holes and the core region are essentially circular, the effective core region diameter is about 0.5 to 6 $\mu$m (e.g., 1.7 $\mu$m), the effective core region area is about 0.2 to 30 $\mu$m$^2$, the diameter of the air holes is about 0.5 to 7 $\mu$m (e.g., 0.7 $\mu$m), and the center-to-center spacing $d_1$ of the air holes is about 0.5 to 7 $\mu$m (e.g., 1.6 $\mu$m). A common outer diameter of the fiber is about 125 $\mu$m although other sizes are suitable. $\Delta$ is relatively large, illustratively about >10% to 30%, where $\Delta=(n_{eff,core}-n_{eff,clad})/n_{eff,core}$, expressed as a percent. MOFs of this type can be single mode or multimode.

Preferred Embodiment

In order to exhibit simultaneously relatively large anomalous dispersion (e.g., 50–200 ps/nm-km) at wavelengths in the visible and near infrared (e.g., in the wavelength range of about 600–1300 nm) and decoupled transverse spatial modes, a MOF in accordance with one embodiment of our invention comprises a core region that has diameter less than about 6 $\mu$m and the effective refractive index difference between the core and the inner cladding is greater than about 0.1 (10%). Preferably, the inner cladding contains no more than two layers of air holes, and the distance $d_2$ between the nearest edges of adjacent air holes is less than about 1 $\mu$m.

We have found that this simple MOF confines radiation to the core region and provides relatively large differences between the effective refractive indices of the lowest order transverse modes in the visible and near infrared wavelength range. These large differences in mode indices inhibit coupling between the modes and allow them to propagate essentially undisturbed even in the presence of significant perturbations (e.g., defects in the fiber, bending of the fiber).

The multimode nature of this type of MOF can be used to phase match nonlinear optical processes such as second harmonic generation and four-wave mixing. Because the radiation generated in a higher-order transverse mode can propagate down the fiber with negligible coupling to other guided modes, long lengths of MOF can be used to allow for efficient nonlinear interactions. That is, since the spatial coherence of the generated radiation does not degrade due to coupling to other spatial modes, efficient nonlinear interactions can occur over relatively long lengths of our MOF.

EXAMPLES

In the following experiments and simulations, the MOF design included an essentially circular silica core region having a diameter of about 1.7 $\mu$m and a single layer of 6 essentially circular air holes arranged to form a hexagon as shown in FIGS. 1–2. The air holes had a diameter of about 1.4 $\mu$m, a center-to-center distance $d_1$ of about 1.86 $\mu$m, a spacing between adjacent holes $d_2$ of about 0.46 $\mu$m, and a $\Delta$ of about 20%.

Figure 3A:
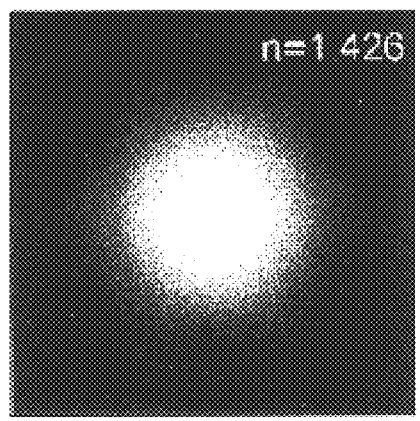
FIGS. 3(a), (b) and (c) show calculated electric field amplitude and effective refractive index for the lowest order transverse spatial modes of a MOF in accordance with one embodiment of our invention.
Figure 3B:
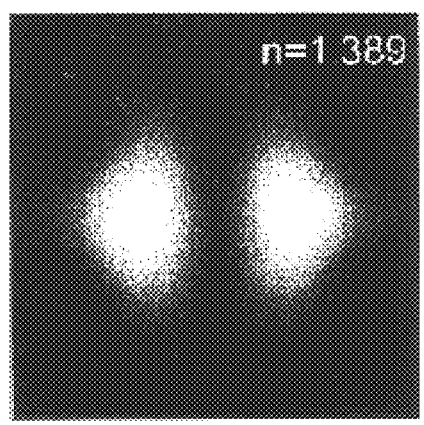
Figure 3C:
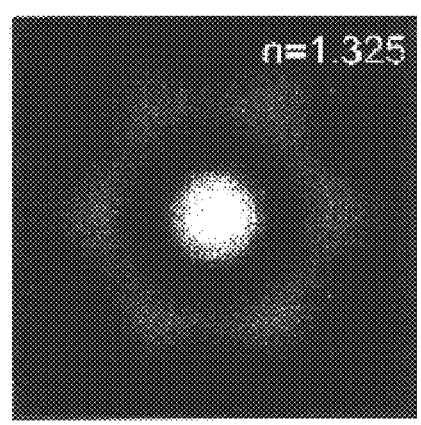

We calculated the properties of the lowest-order transverse spatial modes of this MOF to compare with the experimental observation of single mode behavior. (A single transverse mode could be excited in the MOF for wavelengths between about 500 nm and 1600 nm.) The electric field amplitude and effective refractive index of the lowest-order transverse modes are shown in FIG. 3. The simulations reveal that the individual guided modes can have substantially different propagation constants and corresponding different effective refractive indices: 1.426 for the fundamental transverse mode (FIG. 3a), 1.389 for the first order transverse mode (FIG. 3b), and 1.325 for the second order transverse mode (FIG. 3c). The difference in calculated effective refractive index between the lowest two modes of the MOF, which was about 2.6%, is significantly larger than even the core-cladding index difference in standard optical fibers. As a result, coupling between the fundamental transverse mode and the higher order transverse modes is essentially precluded, even in the presence of significant perturbations.

Experimentally we also have found that due to the small size of the core region only the fundamental transverse mode is excited when the input coupling efficiency is optimized (determined by maximizing the output power from the MOF); excitation of higher-order transverse modes is difficult. Hence, although the MOF can support numerous transverse modes, single mode excitation and propagation can be easily achieved. Increasing the diameter of the core region reduces the difference between the propagation constants of the modes and increases the potential for intramodal coupling. However, even when the MOF dimensions are scaled to a 4 um core region diameter, at a wavelength of 1 $\mu$m the difference in effective refractive index between the lowest two modes is still relatively large (i.e., about 0.78%).

As a result of this apparent single-mode characteristic combined with the small effective area of the core region and high anomalous dispersion characteristic of our MOF, we have been able to demonstrate a number of dramatic nonlinear optical effects that previously have been not been possible or have been severely limited.

For example, we have observed a number of nonlinear effects that utilize birefringent and multimode phase matching. In one experiment, we used a 10-cm length of the above-described MOF. 100 fs duration optical pulses at 895 nm with only 250 W of peak power were launched along a birefringent axis of the fiber. Within the first few centimeters of its length the MOF generated an orthogonally polarized second-harmonic signal.

Figure 4A:
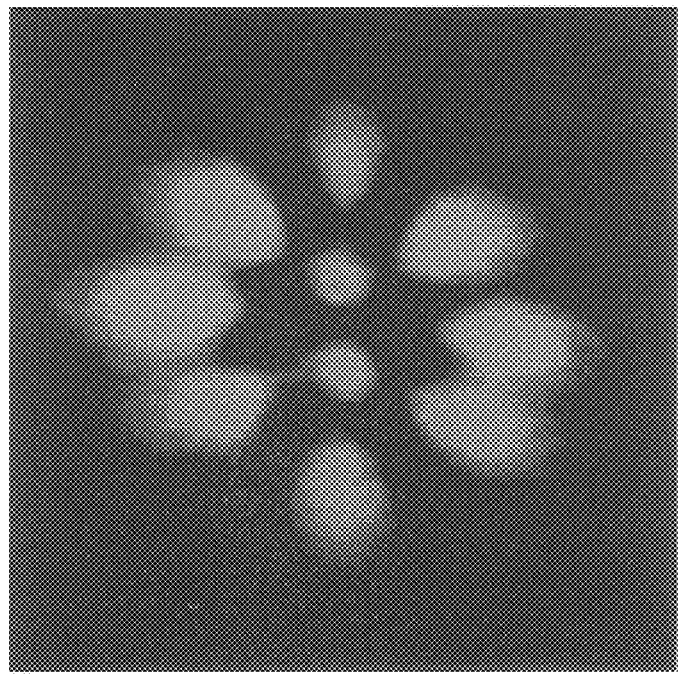
FIGS. 4(a) and (b) show the far-field patterns of the transverse spatial modes at the output of a 50-cm section of MOF that nonlinearly interacts with an optical input signal having a wavelength of 1065 nm.
Figure 4B:
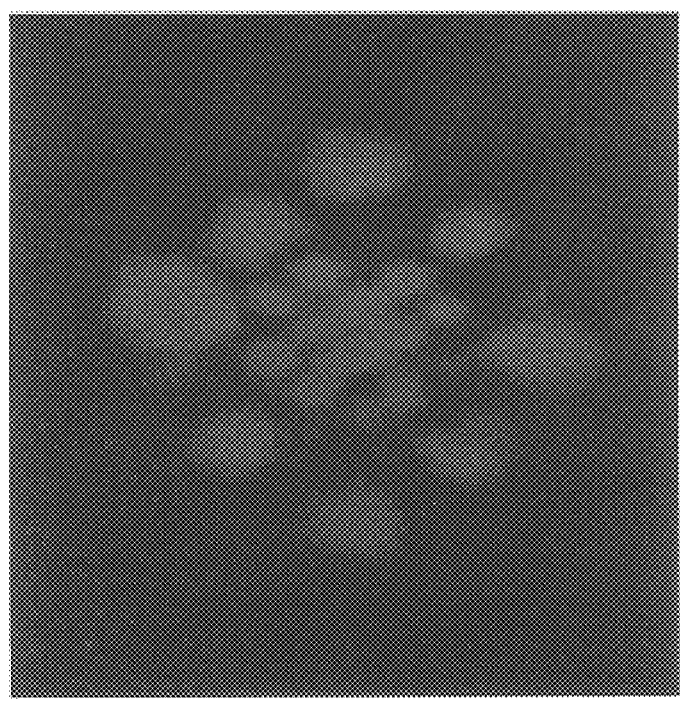
FIG. 4(b) shows the far-field pattern of a third-harmonic output.

In another experiment, we used a 50-cm length of the above-described MOF. We observed clear evidence of multimode phase matching when 1 kW optical pulses from a Q-switched Nd:YAG laser operating at 1064 nm were launched into the fundamental transverse mode of the MOF. Robust second and third-harmonic signals were generated in distinct higher order transverse modes as shown in FIG. 4. For example, when we launched a fundamental-transverse-mode optical signal (FIG. 3a) into the MOF at 1064 nm, that signal excited a higher order mode (FIG. 4a) at a different wavelength (e.g., the second harmonic at 532 nm). Likewise, when we launched a first-order-transverse-mode optical signal (FIG. 3b) into the MOF at 1064 nm, that signal excited a higher order mode (FIG. 4b) at another different wavelength (e.g., the third harmonic at 355 nm).

The harmonic signals were robust in that the generated higher-order modes experimentally appeared to be insensitive to bend loss (e.g., as observed when the fiber was bent into a 5 mm diameter loop) and did not couple to other transverse modes even in the presence of strong perturbations to the fiber. Conversion efficiencies up to about 5% have been achieved.

Applications

Figure 6:
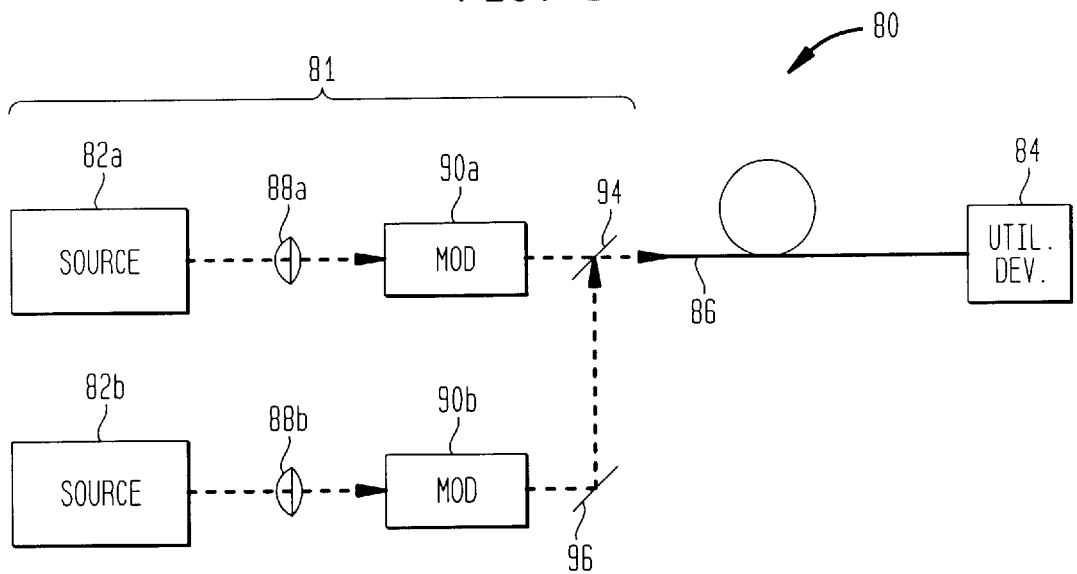
FIG. 6 is a schematic, block-diagrammatic view of an optical communication system in accordance with yet another embodiment of our invention.

As shown in FIG. 6, a communication system 80 includes a communication link 86 between an optical transmitter 81 and a utilization device 84. The utilization device may be a piece of terminal equipment, an optical receiver, a photodetector, an optical amplifier, etc. The link may include one or more optical devices (not shown) that are well known in the art such as optical amplifiers, couplers, multiplexers, isolators etc. In accordance with one embodiment of our invention, at least a segment of link 86 comprises a MOF, as described above, in which the lowest-order transverse spatial modes of the fiber are decoupled from one another over the length of the MOF. With the modes thus decoupled, information may be impressed on each of them independent of one another. To this end, the system 80 is illustratively provided with a pair of optical sources 82a,82b (e.g., lasers) that generate output signals at the essentially the same wavelength. These signals are coupled to the tandem combination of lens means 88a,88b and modulators 90a,90b, respectively. The position of a lens means and its associated modulator may be reversed. The modulators 90a,90b impress information onto the output signals of the optical sources 82a,82b, respectively. The mirrors, or other suitable optical devices, couple the output signals into the link 86. The lens means alter the shapes of the transverse intensity profiles of these output signals so that each excites a different higher order transverse mode in the MOF. These higher order modes, which may have essentially the same wavelength or different wavelengths, propagate down the MOF to utilization device 84 without significantly mixing with one another, thereby enabling the two signals to serve as two separate and independent channels of a communication system. Of course the use of a two-transverse-mode system is illustrative only; more than two could be utilized.

Figure 5:
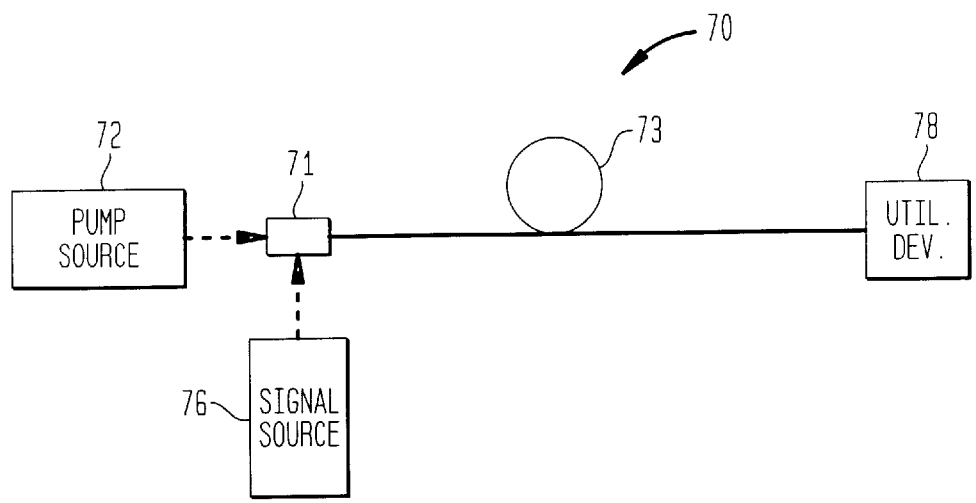
FIG. 5 is a schematic, block-diagrammatic view of a nonlinear system in accordance with another embodiment of our invention.

An alternative embodiment of our invention is shown in FIG. 5. A nonlinear system 70 comprises an optical fiber 73, an optical coupler 71 that couples a pump source 72 and a signal source 74 to an input end of the fiber, and a utilization device 78. The latter is defined above with reference to FIG. 6. The coupler may take on any one of several well-known designs; for example, an optical circulator, a standard 3-db Y-branch coupler, etc. In accordance with this embodiment, at least a section of fiber 73 comprises a MOF of the type described above. In operation, the optical output of the pump source 72 and the optical output of the signal source 76 nonlinearly interact in the MOF to generate a third optical signal, which may be, for example, a sum or difference frequency signal, a second or third harmonic signal, or signals at frequencies above and below the pump signal frequency, depending on the nonlinear process that is being exploited. Importantly, the outputs of the pump and signal sources propagate in different transverse modes and remain decoupled from one another over the length of the MOF. Therefore, random fluctuations and perturbations in the MOF will not mix the generated modes with one another, thereby increasing the efficiency of the nonlinear process and the maintaining the spatial coherence of the output delivered to utilization device 84.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

What is claimed is:

1. An optical system comprising
    an optical transmitter, a utilization device and an optical fiber transmission path that optically couples said transmitter and said device, said transmission path comprising at least a section of microstructure optical fiber in which at least two transverse modes of optical radiation propagating in said fiber are decoupled from one another over the length of said section, and further including a first modulator for impressing information on a first optical signal propagating along said fiber in one of said transverse modes and a second modulator for impressing information on a second optical signal propagating along said fiber in another of said transverse modes, said microstructure fiber comprising
- a core region in which said optical radiation can propagate,
- an inner cladding region surrounding said core region and having an effective refractive index lower than that of said core region,
- an outer cladding region surrounding said inner cladding region,
- said inner cladding region including a multiplicity of features positioned circumferentially in at least one relatively thin layer around said core region, said features being effective to provide index guiding of said radiation, and
- said core region and said inner cladding region being mutually adapted so that said fiber exhibits decoupling of its transverse spatial modes at visible and near infrared wavelengths of said radiation, said core region having a diameter less than about 6 $\mu$m and the difference in effective refractive index between said core region and said inner cladding region being greater than about 10%.

2. The invention of claim of 1 wherein the outer boundary of said features is less than about 10–30 $\mu$m from the outer boundary of said core region.

3. The invention of claim of 2 wherein said features are positioned circumferentially in a multiplicity of relatively thin layers.

4. The invention of claim 1 wherein said inner cladding region includes capillary air holes that form said features.

5. The invention of claim 4 wherein said air holes are positioned circumferentially around said core region in no more than two relatively thin layers and the distance between the nearest edges of adjacent ones of said holes is less than about 1 $\mu$m.

6. The invention of claim 1 wherein the pattern formed by said features comprises geometric figure selected from the group consisting of a hexagon and a triangle.

7. The invention of claim 1 wherein said core region and said cladding regions comprise silica.

8. An optical system comprising
- an optical pump source, and optical signal source, a utilization device and an optical fiber transmission path that optically couples said sources to said device, said transmission path comprising at least a section of microstructure optical fiber in which at least two transverse modes of optical radiation propagating in said fiber are decoupled from one another over the length of said section, the output of said pump source propagating in one of said modes and the output of said signal source propagating in another of said transverse modes, said microstructure optical fiber comprising
- a core region in which said optical radiation propagates,
- an inner cladding region surrounding said core region and having an effective refractive index lower than that of said core region,
- an outer cladding region surrounding said inner cladding region,
- said inner cladding region including a multiplicity of air holes positioned circumferentially in at least one relatively thin layer around said core region, said holes being effective to provide index guiding of said radiation, and
- said core region and said inner cladding region being mutually adapted so that said fiber exhibits decoupling of its transverse spatial modes at visible and near infrared wavelengths of said radiation, said core region having a diameter less than about 6 $\mu$m, the difference in effective refractive index between said core region and said inner cladding region being greater than about 10%.

9. The invention of claim of 8 wherein the outer boundary of said features is less than about 10–30 $\mu$m from the outer boundary of said core region.

10. The invention of claim of 9 wherein said features are positioned circumferentially in a multiplicity of relatively thin layers.

11. The invention of claim 8 wherein said inner cladding region includes capillary air holes that form said features.

12. The invention of claim 11 wherein said air holes are positioned circumferentially around said core region in no more than two relatively thin layers and the distance between the nearest edges of adjacent ones of said holes is less than about 1 $\mu$m.

13. The invention of claim 8 wherein the pattern formed by said features comprises a geometric figure selected from the group consisting of a hexagon and a triangle.

14. The invention of claim 8 wherein said core region and said cladding regions comprise silica.

15. The invention of claim 8 wherein said core region and said cladding regions comprise telluride glass.

* * * * *